United States Patent
Hayashi

(10) Patent No.: US 7,665,758 B2
(45) Date of Patent: Feb. 23, 2010

(54) AIRBAG COVER, INSTRUMENT PANEL, AND AIRBAG APPARATUS

(75) Inventor: Shinji Hayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 201 days.

(21) Appl. No.: 11/822,476

(22) Filed: Jul. 6, 2007

(65) Prior Publication Data

US 2008/0030009 A1  Feb. 7, 2008

(30) Foreign Application Priority Data

Aug. 1, 2006  (JP) .............................. 2006-210293

(51) Int. Cl.
  *B60R 21/215*  (2006.01)
  *B60R 21/205*  (2006.01)
(52) U.S. Cl. ................... 280/728.3; 280/732
(58) Field of Classification Search ................. 280/732, 280/728.3
  See application file for complete search history.

(56) References Cited

U.S. PATENT DOCUMENTS

| | | | | |
|---|---|---|---|---|
| 5,183,289 A | * | 2/1993 | Zeller et al. | 280/728.3 |
| 5,582,424 A | * | 12/1996 | Okuyama et al. | 280/728.3 |
| 6,336,652 B1 | * | 1/2002 | Turnbull et al. | 280/728.3 |
| 6,467,801 B1 | * | 10/2002 | Preisler et al. | 280/728.3 |
| 2002/0074776 A1 | | 6/2002 | Labric et al. | |
| 2004/0056455 A1 | * | 3/2004 | Nishijima et al. | 280/728.3 |
| 2004/0075251 A1 | * | 4/2004 | Fujii et al. | 280/728.3 |
| 2007/0029763 A1 | * | 2/2007 | Hayashi | 280/728.3 |
| 2008/0012273 A1 | * | 1/2008 | Cowelchuk et al. | 280/728.3 |

FOREIGN PATENT DOCUMENTS

| | | |
|---|---|---|
| EP | 1 403 148 A2 | 3/2004 |
| JP | H08-85406 A | 4/1996 |
| JP | 2004-001635 A | 1/2004 |
| JP | 2004-175305 A | 6/2004 |
| JP | 2004-338633 A | 12/2004 |
| JP | 2005-096594 A | 4/2005 |
| JP | 2005-153545 A | 6/2005 |
| WO | WO 03/082635 A2 | 10/2003 |

* cited by examiner

*Primary Examiner*—Ruth Ilan
(74) *Attorney, Agent, or Firm*—Manabu Kanesaka

(57) ABSTRACT

An airbag cover includes an airbag cover main body extending along a surface that faces a front passenger in a vehicle for covering a passenger airbag, a tear line provided at the airbag cover main body for splitting the airbag cover, and a deployment door provided at the airbag cover main body and defined by the tear line. The deployment door is split and deployed along the tear line by pressure of a deployment and inflation load of the passenger airbag. A low-rigidity region and a high-rigidity region are provided at the deployment door to provide different flexural rigidities.

9 Claims, 4 Drawing Sheets vehicle rear ←           vehicle front → vehicle rear ← → vehicle front

AIRBAG COVER, INSTRUMENT PANEL, AND AIRBAG APPARATUS

BACKGROUND OF THE INVENTION AND RELATED ART STATEMENT

The present invention relates to a construction technique of an airbag cover mounted to a front passenger airbag provided in a vehicle.

An example of a known passenger airbag apparatus is Japanese Unexamined Patent Application Publication No. 2004-1635. In the passenger airbag apparatus, an airbag cover for covering the passenger airbag has a tear line for splitting the airbag cover. In case of a vehicle collision, the airbag cover is split along the tear line, and a deployment door is deployed, so as to allow the passenger airbag to be deployed and inflated to the outside of the airbag cover.

Generally, the design of such an airbag apparatus is required to be able to smoothly split the airbag cover along the tear line when the passenger airbag is deployed and inflated, and promptly restrain a front passenger.

In light of the above circumstances, in an airbag cover for covering a front passenger airbag provided in a vehicle, an object of the present invention is to provide a technique effective for smoothly splitting the airbag cover along a tear line when the passenger airbag is deployed and inflated in case of a traffic accident.

Further objects and advantages of the invention will be apparent from the following description of the invention.

SUMMARY OF THE INVENTION

To attain the above-described object, an airbag cover according to the present invention includes at least an airbag cover main body, a tear line, a deployment door, a low-rigidity region, and a high-rigidity region. The airbag cover main body of the present invention extends along a surface that faces a front passenger in a vehicle, and covers the passenger airbag. The tear line of the present invention is provided at the airbag cover main body, and serves as a tear line (expected to be a split line) for splitting the airbag cover. The tear line is a portion of the airbag cover main body, the portion being reduced in thickness typically by ultrasonic machining or laser beam machining. The portion is also called "a thin portion" or "a thickness-reduced portion".

In the present invention, the tear line corresponds to a portion of, or the whole split line which is actually split along the tear line. In other words, the tear line is only required to provide the split line that allows the airbag cover to be split in a desired manner. Therefore, the split line may be longer than the tear line. The deployment door of the present invention is provided at the airbag cover main body and defined by the tear line. The deployment door is a plate-like portion that is split and deployed along the tear line by pressure of the passenger airbag. The low-rigidity region and high-rigidity region of the present invention are provided at the deployment door and have different flexural rigidities. The low-rigidity region and high-rigidity region are provided by relatively varying the density of the deployment door, or by relatively varying the thickness of the deployment door.

With this configuration, when the passenger airbag is deployed and inflated, the deployment door is bent such that the low-rigidity region of the deployment door having a relatively small flexural rigidity protrudes toward the front passenger, and the deployment door is split along the tear line by a tension load that is applied to an outer edge of the deployment door toward the low-rigidity region. Since the tension load is applied in the directions orthogonal to the depth direction of grooves of the tear line, the airbag cover main body can be smoothly split along the tear line by the relatively small load. Accordingly, the deployment operation of the deployment door allows the airbag to protrude outside the airbag cover, so that the airbag is deployed and inflated to an occupant restraint region and promptly restrains the front passenger while the resistance of the airbag when protruding outside the airbag cover is suppressed. Thus, in case of a traffic accident, it is possible to enhance the restraining performance for the front passenger.

Also, with an airbag cover according to the present invention, the deployment door includes a first extending portion that extends to the front passenger and a second extending portion that extends to the passenger airbag. The first and second extending portions are connected to each other by welding with a plurality of welded ribs interposed to stand along a thickness direction of the deployment door. The low-rigidity region is provided by reducing the number of welded ribs per unit area as compared with that of the high-rigidity region. In particular, the density of the deployment door may be varied between the low-rigidity region and the high-rigidity region by varying the number of welded ribs. The plurality of welded ribs in this configuration may be provided at least one of the first and second extending portions.

In particular, the plurality of welded ribs may be provided at either one of the first extending portion or the second extending portion, or both of the first and second extending portions. With this configuration, the airbag cover with the reasonable structure is provided such that the plurality of welded ribs, which connect the first and second extending portions to each other by welding, is used as means for creating the low-rigidity region and the high-rigidity region.

An instrument panel according to the present invention is located in front of a front seat provided in the vehicle, and elongated in a horizontal direction. The above-described airbag cover is integrally formed with the instrument panel. With this configuration, the instrument panel is integrally formed with the airbag cover capable of being smoothly split along the tear line when the passenger airbag is deployed and inflated in case of a traffic accident.

"The instrument panel" mentioned herein is a panel body (also called "a dashboard") that is located in front of a driver seat and the front passenger seat provided in a vehicle cabin, namely, at a portion extending between a windshield and occupant sitting on the front seat, and extends in the horizontal direction along the width of the vehicle. "The instrument panel" is defined by the entire panel body including not only a panel of the instruments such as a speedometer and a tachometer located in front of the driver seat, but also a glove compartment for accommodating small articles, a portion mounted with a front passenger airbag module and the like. Moreover, the instrument panel may include air outlets of an air conditioner of the vehicle, and a portion accommodating a stereo system of the vehicle.

An airbag apparatus according to the present invention includes at least a passenger airbag, an airbag housing, a gas supplier, and an airbag cover. The passenger airbag of the present invention serves as an airbag for a front passenger in a vehicle. The airbag housing serves as an airbag housing that accommodates the passenger airbag folded in advance in a predetermined manner (for example, folded in a roll-like manner or a concertina-like manner, or folded by machine). The gas supplier of the present invention supplies inflation gas to the passenger airbag so that the passenger airbag is deployed and inflated while protruding from the airbag housing.

In particular, the airbag cover according to the present invention includes at least an airbag cover main body, a tear line, a deployment door, a low-rigidity region, and a high-rigidity region. The airbag cover main body, tear line, deployment door, low-rigidity region and high-rigidity region are substantially similar to the above-mentioned airbag cover main body, tear line, deployment door, low-rigidity region and high-rigidity region, respectively.

With this airbag apparatus having the above configuration, when the passenger airbag is deployed and inflated, the deployment door is bent such that the low-rigidity region of the deployment door having a relatively small flexural rigidity protrudes toward the front passenger, and the deployment door is split along the tear line by a tension load that is applied to an outer edge of the deployment door toward the low-rigidity region. The tension load is applied in the directions orthogonal to the depth direction of the grooves of the tear line. This allows the airbag cover main body to be smoothly split along the tear line by a relatively small load as compared with the case of a deployment door having a uniform flexural rigidity. Accordingly, the deployment operation of the deployment door allows the airbag to protrude outside the airbag cover, so that the airbag is deployed and inflated to an occupant restraint region and promptly restrains the front passenger while the resistance of the airbag when protruding outside the airbag cover is reduced. Thus, in case of a traffic accident, it is possible to enhance the restraining performance for the front passenger.

Also, with an airbag apparatus according to another aspect of the present invention, the deployment door of the airbag cover includes a first extending portion that extends on a side of the front passenger, and a second extending portion that extends on a side of the passenger airbag, the first and second extending portions being connected to each other by welding with a plurality of welded ribs interposed to stand along a thickness direction of the deployment door. The low-rigidity region is provided by reducing the number of welded ribs per unit area as compared with that of the high-rigidity region. The configuration is similar to the welding structure of the above-described airbag cover. With this configuration, the airbag apparatus provided with the airbag cover having the reasonable structure is provided such that the plurality of welded ribs, which connect the first and second extending portions to each other by welding, is used for defining the low-rigidity region and the high-rigidity region.

As described above, with the present invention, the airbag cover for covering the passenger airbag provided in the vehicle has the low-rigidity region and the high-rigidity region provided at the deployment door and having the different flexural rigidities. The deployment door is bent such that the low-rigidity region with the relatively small flexural rigidity protrudes toward the front passenger, and the deployment door is split along the tear line by the tension load applied to the outer edge of the deployment door toward the low-rigidity region. Accordingly, the airbag cover can be smoothly split along the tear line.

DETAILED DESCRIPTION OF THE EMBODIMENTS

An airbag apparatus 100 is described below with references to the attached drawings as an embodiment of an airbag apparatus of the present invention. Though not particularly shown, the airbag apparatus 100 is mounted to a front passenger seat provided in a vehicle, and configured as a passenger airbag apparatus.

Figure 1:
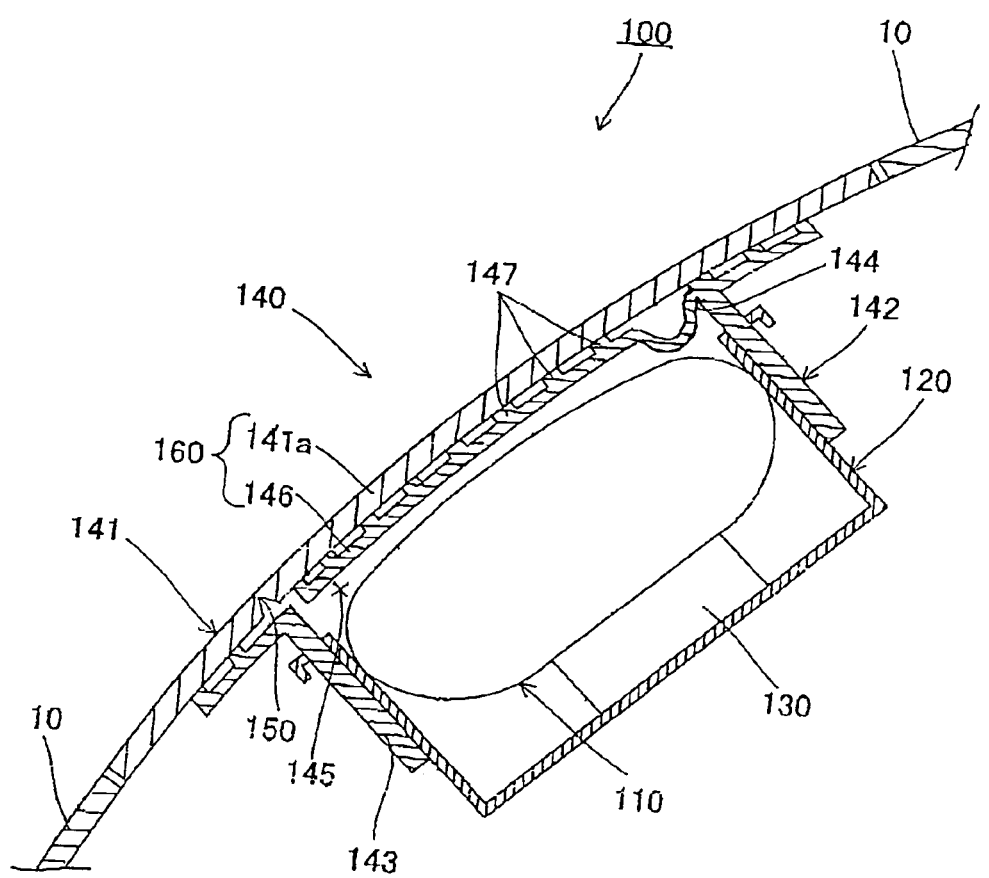
FIG. 1 is a cross-sectional view showing the structure of an airbag apparatus according to an embodiment.
Figure 2:
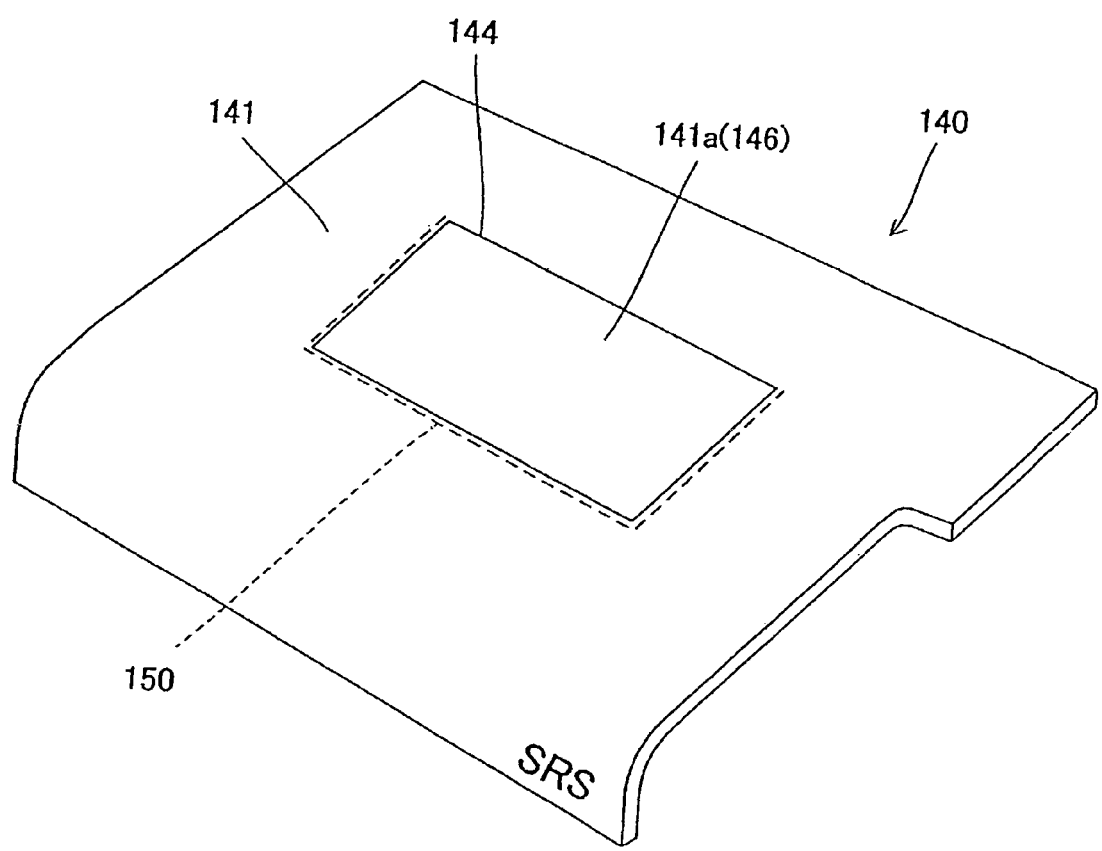
FIG. 2 is a perspective view showing an airbag cover shown in FIG. 1.

First, the configuration of the airbag apparatus 100 is described with references to FIGS. 1 and 2. FIG. 1 is a cross-sectional view showing the structure of the airbag apparatus 100 according to the present embodiment. FIG. 2 is a perspective view showing an airbag cover 140 shown in FIG. 1.

As shown in FIG. 1, the airbag apparatus 100 according to the present embodiment mainly consists of an airbag 110, a retainer 120, an inflator 130, and the airbag cover 140. The airbag apparatus 100 is also called "an airbag module".

In case of a traffic accident, the airbag 110 is deployed and inflated while protruding toward the front passenger seat, and restrains a front passenger. This airbag corresponds to a passenger airbag of the present invention.

The retainer 120 serves as an airbag housing that accommodates the airbag 110 folded in advance in a predetermined manner (for example, a roll-like manner, a concertina-like manner, or by a machine). This retainer 120 corresponds to an airbag housing of the present invention.

In case of a traffic accident, the inflator 130 serves as means for supplying gas to the airbag 110 by generating inflation gas. This inflator 130 corresponds to a gas supplier of the present invention.

The airbag cover 140 is disposed at an instrument panel 10 of the vehicle, and serves as a cover body for covering the airbag 110 accommodated in the retainer 120. The airbag cover 140 includes at least an airbag cover main body 141, a frame 142, a tear line 150 and a deployment door 160. This airbag cover 140 corresponds to an airbag cover of the present invention.

The instrument panel 10 is located in front of a front seat provided in the vehicle, and extends in a horizontal direction. The airbag cover 140 is integrally formed with the instrument panel 10 by vibration welding or the like. In particular, the instrument panel 10 is a panel body (also called "a dashboard") that is located in front of a driver seat and the front passenger seat provided in a vehicle cabin, namely, at a portion extending between a windshield and occupant sitting on the front seat, and extends in the horizontal direction along the width of the vehicle. The instrument panel 10 is defined by the entire panel body including not only a panel of instruments such as a speedometer and a tachometer located in front of the driver seat, but also a portion mounted with the airbag 110 and the like according to the present embodiment and a glove compartment for accommodating small articles. Moreover, the instrument panel 10 may include air outlets of an air conditioner of the vehicle, and a portion accommodating a stereo system of the vehicle. This instrument panel 10 corresponds to an instrument panel of the present invention.

The airbag cover main body 141 is a plate-like portion extending along a surface that faces the front passenger. The airbag cover main body 141 is made by a resin material such as a polypropylene (PP) material, or an olefin elastomer (TPO) material. The external surface of the airbag cover main body 141 may be coated with a resin skin. This airbag cover main body 141 corresponds to an airbag cover main body of the present invention.

On the back side of the airbag cover main body 141, the tear line 150 is provided as an expected split line for splitting the airbag cover. The tear line 150 is a portion of the airbag cover main body 141, the portion being reduced in thickness typically by ultrasonic machining or laser beam machining. The portion is also called a thin portion or a thickness-reduced portion. This tear line 150 corresponds to a tear line for splitting an airbag cover of the present invention.

In the airbag cover main body 141, an openable portion 141a is defined by the tear line 150. The openable portion 141a is deployed (or "opened") with a flap portion 146 (described below) because the tear line 150 is split when the airbag 110 is deployed and inflated. The tear line 150 corresponds to a portion, or whole split line which is actually split. In other words, the tear line 150 is only required to provide the split line that allows the airbag cover 140 to be split in a desired manner. Therefore, the split line may be formed to be longer than the tear line 150.

The frame 142 is attached to the back side of the airbag cover main body 141. The frame 142 includes a tube or cylindrical portion 143 fixed to the retainer 120 and formed in a rectangular shape, and the flap portion 146 that allows an upper opening 145 of the tube portion 143 to be opened or closed with a hinge 144 interposed between the tube portion 143 and the flap portion 146. As shown in FIGS. 1 and 2, the shape of the flap portion 146 almost corresponds to that of the openable portion 141a.

To connect the airbag cover main body 141 and the frame 142, a plurality of welded ribs is provided on the upper side of the frame 142 (a surface facing the airbag cover main body 141) to stand along the thickness direction of the airbag cover main body 141, and the airbag cover main body 141 and the frame 142 are connected by the known vibration welding method.

Figure 3:
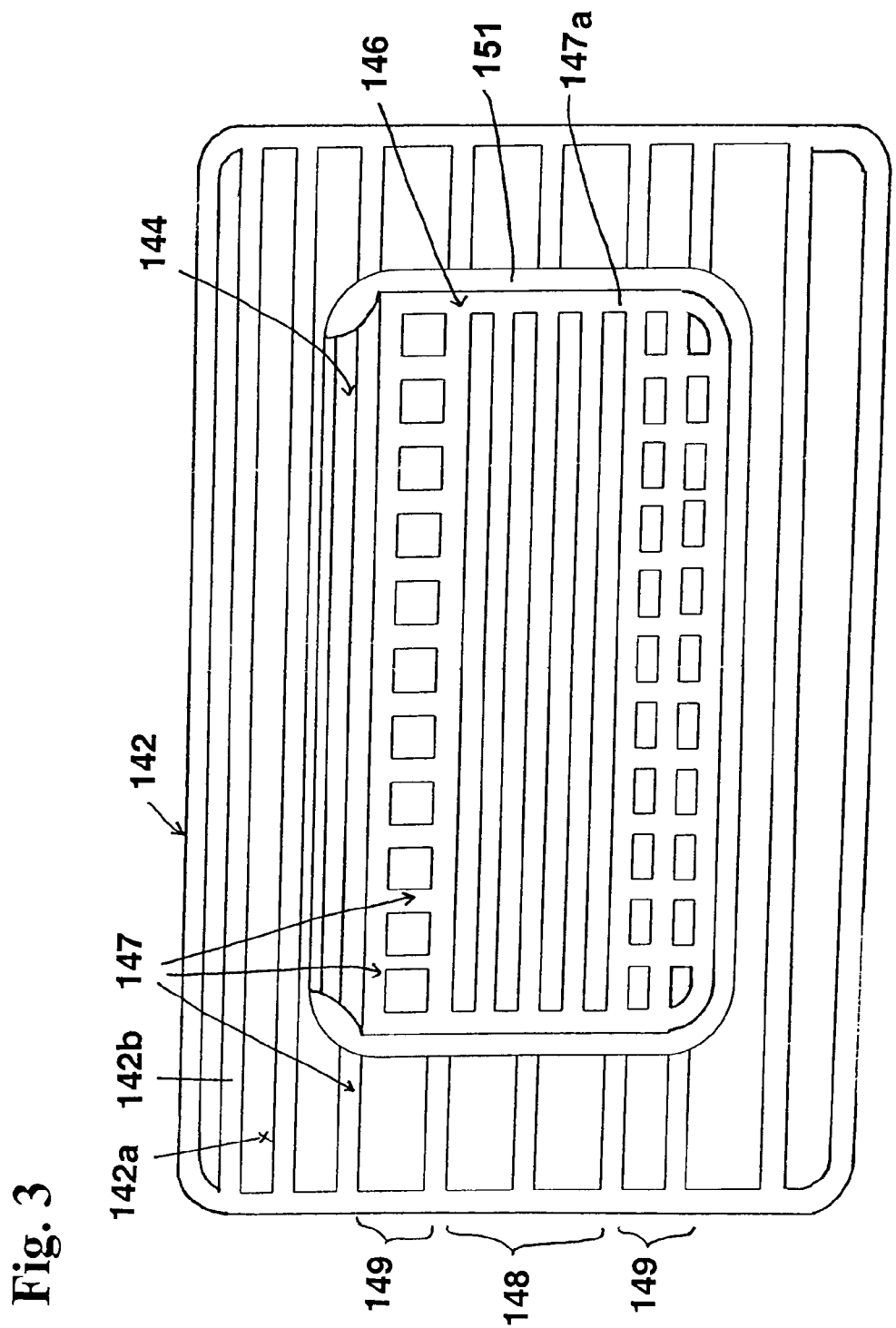
FIG. 3 is a plan view showing the upper side of a frame according to the embodiment.

FIG. 3 is a plan view showing the upper side of the frame 142 according to the present embodiment. As shown in FIG. 3, plurality of welded ribs 147 is provided on the upper side of the frame 142 to stand from a bottom 142a to a top 142b thereof on the upper side of the frame 142. The welded ribs 147 extend in the widthwise direction (horizontal direction in FIG. 3) and in the lengthwise direction (vertical direction in FIG. 3). The welded ribs 147 correspond to welded ribs of the present invention.

An area of the upper side of the frame 142 corresponding to the flap portion 146 includes a first region 148 with the welded ribs 147 extending only in the widthwise direction, and second regions 149 with the welded ribs 147 extending in the widthwise and lengthwise directions in a grid pattern. The first region 148 is provided between two second regions 149 and elongated in the widthwise direction substantially at the center region in the lengthwise direction of the flap portion 146. The first region 148 has the number of welded ribs 147 per unit area smaller than that of the second region 149 so as to serve as a low-rigidity region with a relatively small flexural rigidity.

The second regions 149 are provided on both sides of the first region 148, and elongated in the widthwise direction along the first region 148. Each second region 149 has a number of welded ribs 147 per unit area larger than that of the first region 148, so as to serve as a high-rigidity region with a relatively large flexural rigidity. Since the number of welded ribs 147 of the first region 148 is different from that of the second region 149, the first region 148 may have the density of the flap portion 146 relatively different from that of the second region 149. This first region 148 corresponds to a low-rigidity region of the present invention, and this second region 149 corresponds to a high-rigidity region of the present invention.

The flap portion 146 also includes a rib 147a, which surrounds the first region 148 and the second region 149. A slit 151 is formed immediately outside the rib 147a. Thus, the flap portion 146 is defined by the slit 151 and the hinge 144.

Figure 4:
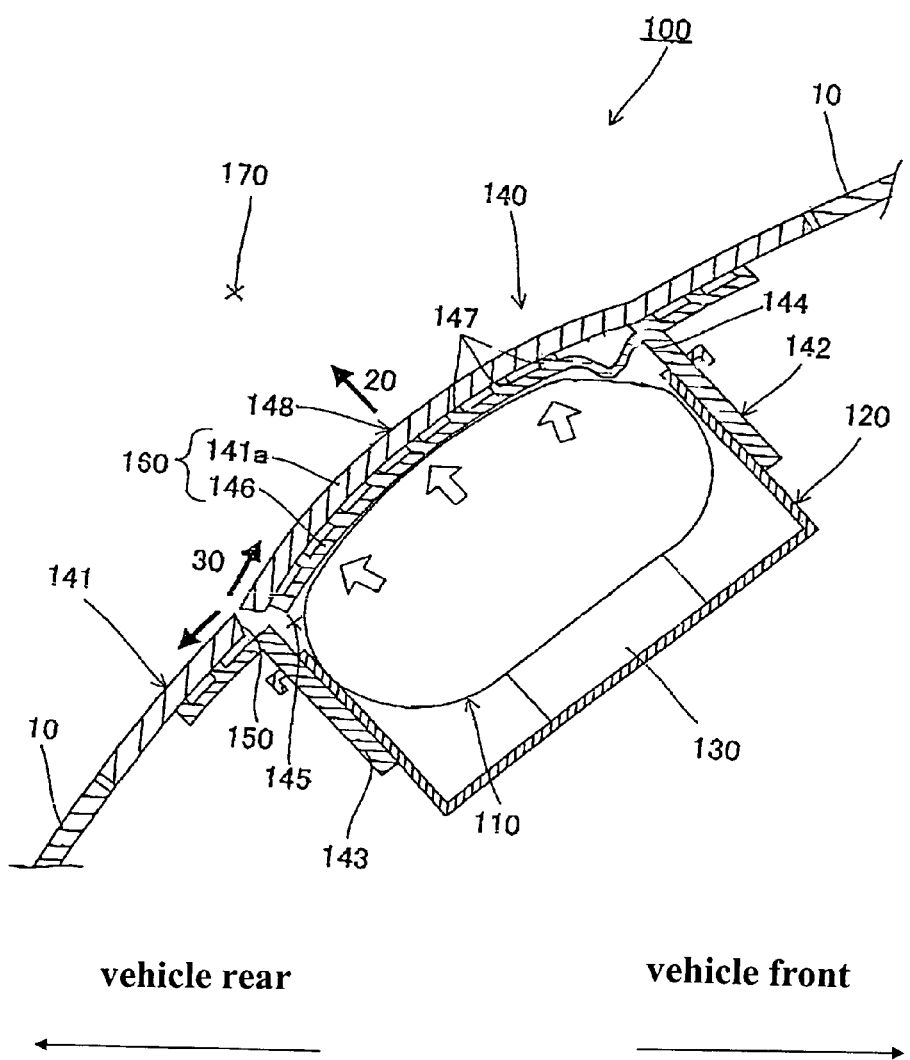
FIG. 4 is a cross-sectional view showing the structure of the airbag apparatus when the airbag cover according to the embodiment is about to open.

The operation of the above-described airbag apparatus 100 is described with reference to FIG. 4. FIG. 4 is a cross-sectional view showing the structure of the airbag apparatus 100 when the airbag cover 140 according to the present embodiment is about to open.

In case of a traffic accident, when a sensor (not shown) detects or predicts a vehicle collision, the airbag apparatus 100 is activated, and the inflator 130 supplies the inflation gas to the airbag 110. The airbag 110 is deployed and inflated while protruding in a direction indicated by the arrow 20 shown in FIG. 4 to the outside of the retainer 120. The protrusion direction corresponds to a direction toward an occupant restraint region 170 where the front passenger is restrained by the airbag 110, or a direction toward the front passenger.

At this time, as shown in FIG. 4, the flap portion 146 is pushed by a deployment and inflation load of the airbag 110, and the deployment operation of the airbag cover main body 141 is started through the hinge 144 connecting the flap portion 146 and the airbag cover main body 141. As the airbag 110 is further deployed and inflated, the airbag cover main body 141 is split along the tear line 150. Accordingly, the deployment door 160 including the openable portion 141a and the flap portion 146, which are connected to each other by welding, is deployed. This deployment door 160 corresponds to a deployment door of the present invention. This openable portion 141a is a portion of the deployment door 160 extending to the front passenger side, and corresponds to a first extending portion of the present invention. This flap portion 146 is a portion of the deployment door 160 extending to the passenger airbag side and corresponds to a second extending portion of the present invention.

In the present embodiment, since the deployment door 160 includes the first region 148 with the relatively small flexural rigidity, the deployment door 160 is bent such that the first region 148 protrudes toward the front passenger. The airbag cover main body 141 is split along the tear line 150 by a tension load applied to the outer edge of the deployment door 160 toward the first region 148 (tension load in a direction indicated by the arrow 30 in FIG. 4). The tension load is applied in the directions orthogonal to the depth direction of grooves of the tear line 150. This allows the airbag cover main body 141 to be smoothly split along the tear line 150 by a relatively small load as compared with the case of a deployment door having a uniform flexural rigidity. Accordingly, the deployment operation of the deployment door 160 allows the airbag 110 to protrude outside the airbag cover 140 through the upper opening 145, so that the airbag 110 is deployed and inflated to the occupant restraint region 170 and promptly restrains the front passenger while the resistance of the airbag 110 when protruding outside the airbag cover 140 is reduced. Thus, in case of a traffic accident, it is possible to enhance the restraining performance for the front passenger.

Note that the positions and sizes of the first region 148 and second regions 149 may preferably be determined in accordance with the desired degree of bending and the desired manner of deployment of the deployment door 160.

As described above, with the present embodiment, since the airbag cover 140, which covers the airbag 110 for the front passenger seat provided in the vehicle, includes the first region 148 and the second region 149 having the different flexural rigidities at the deployment door 160 (flap portion 146), the airbag cover 140 can be smoothly split along the tear line 150. Since the airbag cover 140 has the plurality of welded ribs 147, which connects the openable portion 141*a* and the flap portion 146 to each other by welding and are used for providing the first region 148 and the second regions 149, the configuration is reasonable.

In addition, according to the present embodiment, the instrument panel 10 is provided and integrally formed with the airbag cover 140 capable of being smoothly split along the tear line 150 when the airbag 110 is deployed and inflated in case of a traffic accident.

Further, according to the present embodiment, the airbag apparatus 100 is provided, and it can enhance the restraining performance for the front passenger in case of a traffic accident.

The present invention is not limited to the above-described embodiment, and various applications and modifications can be made. For example, the following modifications, having the above-stated embodiment applied, may be implemented.

In the deployment door 160, while the first region 148 (low-rigidity region) is defined by reducing the number of welded ribs 147 per unit area as compared with that of the second regions 149 (high-rigidity region) in the above-described embodiment, the present invention may provide the low-rigidity region and the high-rigidity region by relatively varying the density of the deployment door or by relatively varying the thickness of the deployment door.

While only the flap portion 146 of the deployment door 160 is provided with the plurality of welded ribs 147 in the above-described embodiment, at least one of the openable portion 141*a* and the flap portion 146 may be provided with the plurality of welded ribs 147 in the present invention. For example, the plurality of welded ribs 147 may be provided only at the openable portion 141*a*, or may be provided at both of the openable portion 141*a* and the flap portion 146.

The disclosure of Japanese patent Application No. 2006-210293 filed on Aug. 1, 2006 is incorporated as a reference.

While the invention has been explained with reference to the specific embodiments of the invention, the explanation is illustrative and the invention is limited only by the appended claims.

What is claimed is:

1. An airbag cover for a passenger airbag comprising:
   an airbag cover main body for covering the passenger airbag,
   a tear line provided at the airbag cover main body to split the airbag cover,
   a deployment door provided at the airbag cover main body and defined by the tear line,
   a low-rigidity region and a high-rigidity region higher in rigidity than the low-rigidity region, provided at the deployment door, said high-rigidity region being provided at an area close to the tear line to be torn by a tension load applied to the high-rigidity portion through the low-rigidity portion, and
   a surrounding rib provided at the deployment door to continuously surround the low-rigidity region and the high-rigidity region so that the tear line is formed immediately outside the surrounding rib, wherein the airbag cover main body includes an outside portion located laterally outside the deployment door separated by the tear line, said outside portion having rigidity less than the low-rigidity portion inside the deployment door.

2. The airbag cover according to claim 1, wherein the deployment door is arranged to be cut and deployed along the tear line by pressure caused by a deployment and inflation load of the passenger airbag.

3. The airbag cover according to claim 1, wherein the deployment door is arranged to bend such that the low-rigidity region of the deployment door protrudes toward the front passenger, and split along the tear line by the tension load applied to an outer edge of the deployment door toward the high-rigidity region when the passenger airbag is deployed and inflated.

4. The airbag cover according to claim 1, wherein
   the deployment door comprises a first portion located at a side of a front passenger and a second portion located at a side opposite to the first portion, the second portion having a plurality of ribs standing along a thickness direction of the deployment door, the ribs being welded to the first portion, and
   the low rigidity region having a number of ribs less than that of the high-rigidity region per unit area.

5. The airbag cover according to claim 4, wherein said second portion includes two high-rigidity portions and one low-rigidity portion between the two high rigidity portions, the high- and low-rigidity portions extending in a width direction of the deployment door.

6. The airbag cover according to claim 5, wherein said high- and low-rigidity portions include long ribs extending in the width direction, and said high-rigidity portions include short ribs extending perpendicular to the long ribs.

7. An instrument panel located in front of a front seat provided in a vehicle and extending in a horizontal direction comprising: the airbag cover according to claim 1, integrally formed with the instrument panel.

8. An airbag apparatus comprising:
   a passenger airbag for a front passenger in a vehicle,
   an airbag housing for accommodating the passenger airbag folded in advance,
   a gas supplier for supplying inflation gas to the passenger airbag, and
   the airbag cover according to claim 1.

9. The airbag cover according to claim 1, wherein the outside portion has number of ribs less than that of the low-rigidity portion.

* * * * *